Dec. 26, 1950     W. FURMINGER     2,535,848
FEEDER FOR COLLAPSED CAN BODIES
Filed Jan. 7, 1946     4 Sheets-Sheet 1

Inventor
WM. FURMINGER

By Mason, Porter & Miller
Attorneys

Dec. 26, 1950 W. FURMINGER 2,535,848
FEEDER FOR COLLAPSED CAN BODIES
Filed Jan. 7, 1946 4 Sheets-Sheet 3

Inventor
WM. FURMINGER
By Mason, Porter & Miller
Attorneys

Dec. 26, 1950     W. FURMINGER     2,535,848
FEEDER FOR COLLAPSED CAN BODIES

Filed Jan. 7, 1946     4 Sheets-Sheet 4

Inventor
WM. FURMINGER
By Mason, Porter Miller
Attorneys

UNITED STATES PATENT OFFICE 2,535,848

FEEDER FOR COLLAPSED CAN BODIES

William Furminger, Seattle, Wash., assignor to Continental Can Company, Inc., New York, N. Y., a corporation of New York Application January 7, 1946, Serial No. 639,556

4 Claims. (Cl. 214—8.5)

The following specification relates to novel improvements in a mechanism for feeding collapsed can bodies by gravity one at a time from a stacked supply.

It is the practice to collapse cylindrical can bodies for economy of space in storage and transportation. When it is desired to utilize such can bodies they are re-formed into the original cylindrical shape by means of well-known machines.

Feeding the collapsed can bodies to the re-forming machines is sometimes accomplished by the use of screw conveyers which, however, are liable to pick up two collapsed bodies in place of one and consequently become jammed.

It is an object of my invention to provide an improved feeder by which collapsed can bodies are removed one at a time from the bottom of a stack by gravity and conveyed to the re-forming machine.

It is a further object of my invention to provide novel means for supporting all of the stack of can bodies except the lowermost, in feeding position, but out of reach of the conveying mechanism.

It is also an object of my invention to provide positive means to arrest the fall of can bodies from the stack in the event of stoppage or congestion in the related delivery devices.

Further objects of my invention will be apparent from the following description of the preferred form of my invention as disclosed in the drawings in which—

Figure 1:
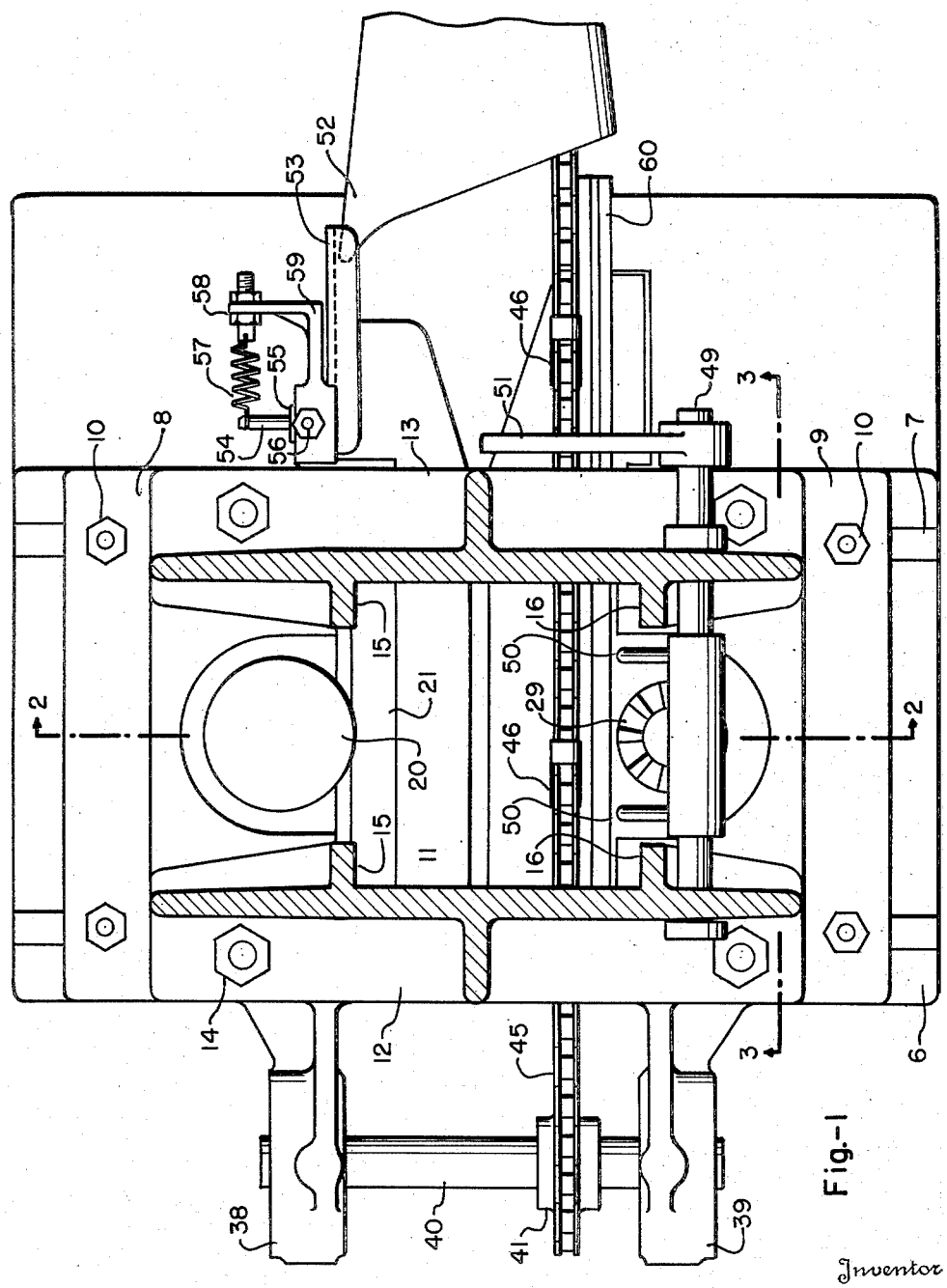
Fig. 1 is a top plan view partly in section of my improved feeding mechanism.

As exemplifying my invention I have shown the novel features of the feeding mechanism on the accompanying drawings. The collapsed can bodies to be conveyed individually to the re-forming machine are held in a hopper or chute the bottom of which is arranged above special means for feeding the bodies one at a time to a conveying means. Associated with the bottom of the hopper is an arrangement of devices which serves to allow the bodies to be separated from the stack one at a time and placed in the line of travel of the conveying means.

A suitable foundation 6 is provided with a pair of tracks 7, 7 which run transversely of the machine proper. Slidably mounted upon the tracks 7 are two base sections 8 and 9. These sections are held in adjusted position by bolts 10. This adjustment permits the change necessary to accommodate can bodies of different circumferential size.

The hopper 11 consists of a front section 12 and a rear section 13. These sections are suitably bolted as shown at 14 to the individual base sections 8 and 9 and serve to bridge over the spacing between the latter.

Each hopper section has a pair of vertically arranged flanges 15 and 16. The distance between the flanges 15 and 16 is slightly more than the width of the collapsed can body so that the stack of such bodies rests horizontally and in a vertical column. The proportions are such that the can bodies fall through the hopper freely unless supported from below.

Figure 2:
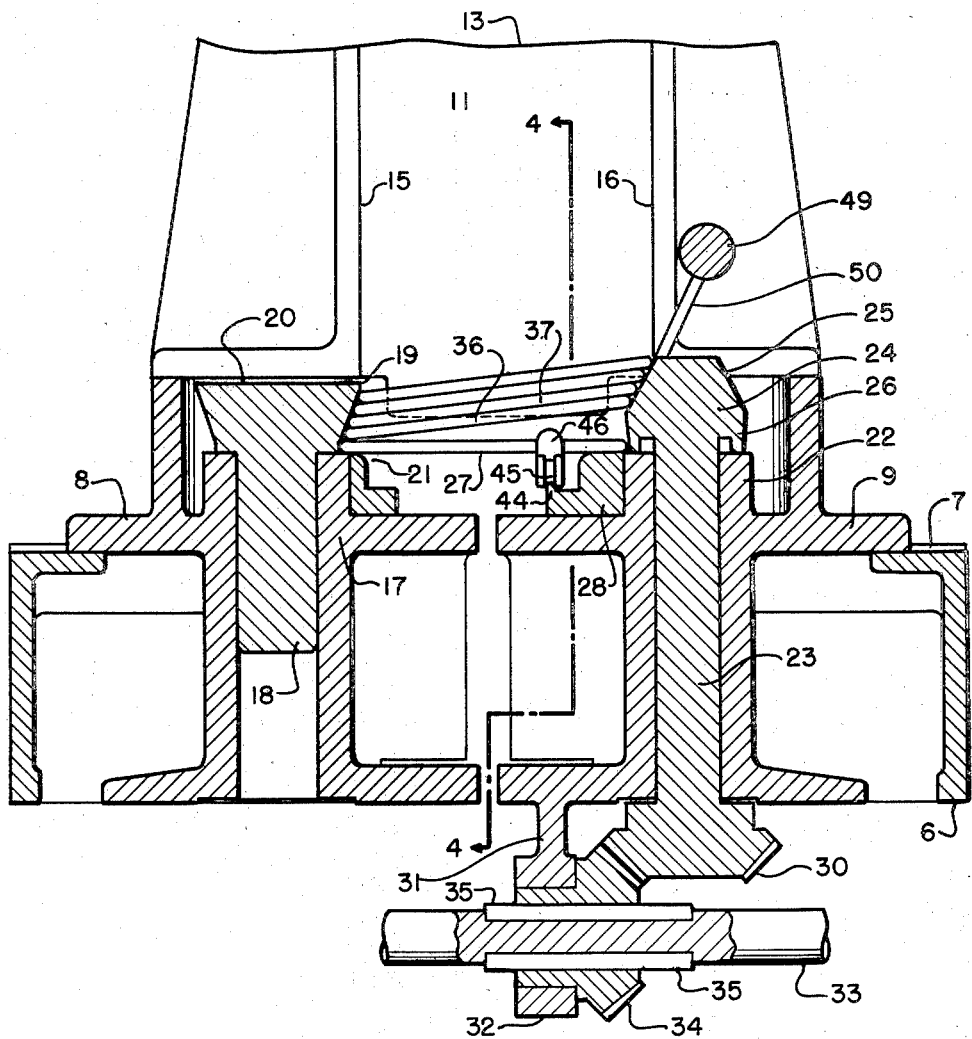
Fig. 2 is a transverse vertical section taken on the line 2—2 of Fig. 1.
Figure 3:
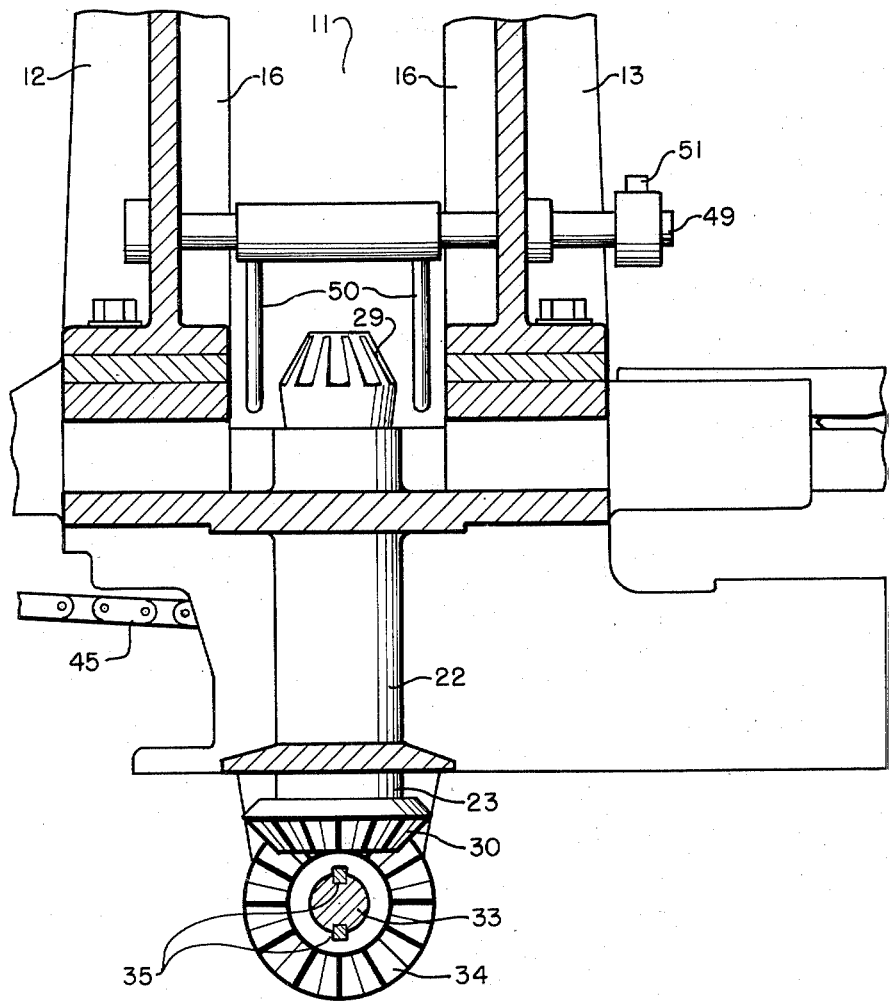
Fig. 3 is a longitudinal vertical section taken on the line 3—3 of Fig. 1.
Figure 4:
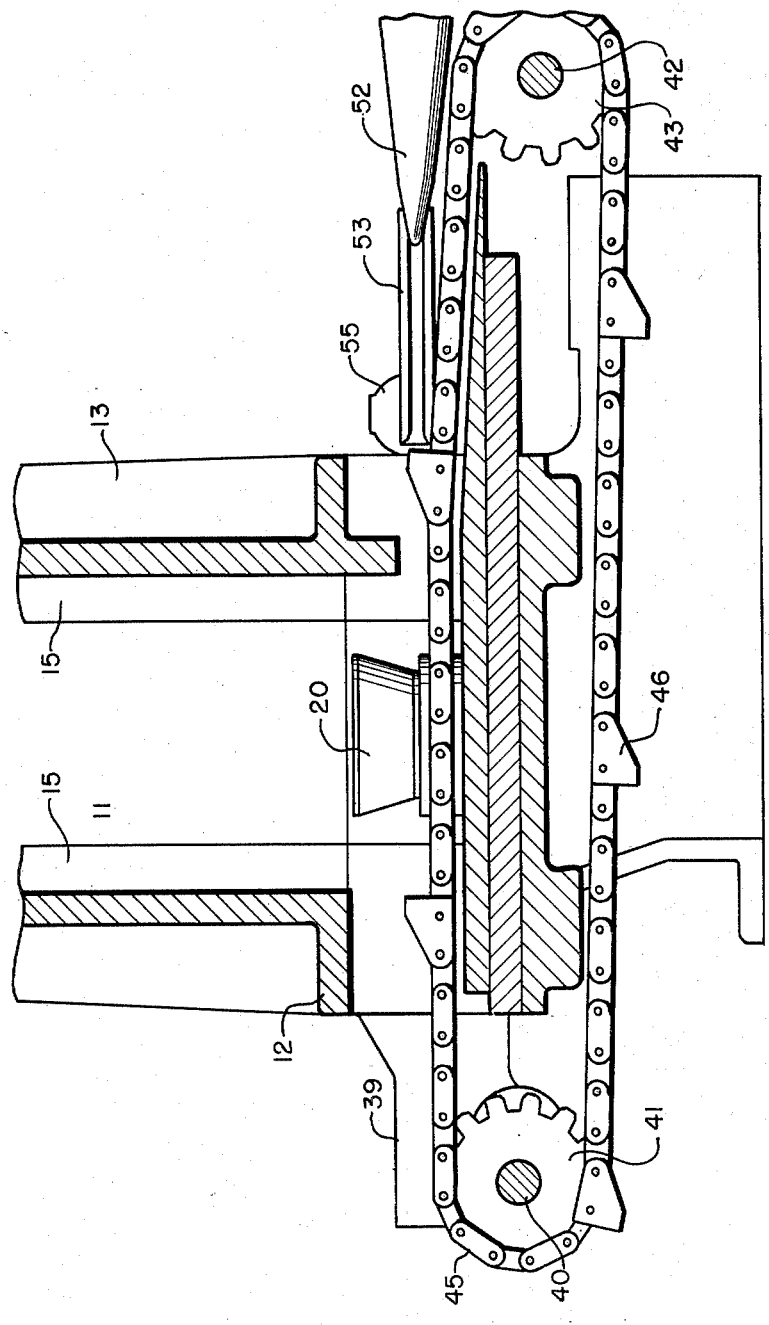
Fig. 4 is a longitudinal vertical section taken on the line 4—4 of Fig. 2.

Base 8 is provided with a vertical bearing 17. A loose shaft 18 is journaled in the bearing 17 and its upper end is formed with an abutment 19. This abutment is in the shape of an inverted truncated cone with its larger base 20 substantially beneath the inner wall of the hopper section 12. However, as shown in Fig 2, this does not interfere with the free drop by gravity of the individual can bodies. The taper of the cone is such that the can bodies move laterally toward the loose shaft 18. The shaft permits rotary movement to reduce friction and compensate for wear.

A rail 21 extends longitudinally of the base 8 and its top is on the level with the top of the bearing 17 and the lesser diameter of the cone 19.

The opposite base 9 also has a vertical bearing 22. This bearing is similar to bearing 17. It carries a vertical shaft 23 which projects both above and below the base 9. Above the base 9 the shaft 23 terminates in an agitator 24. This agitator has a conical section 25 and a reverse tapered lower section 26 which extends downwardly to the top of the bearing 22 as shown in Fig 2. The conical portion 25 is so designed that the horizontal distance of any point is closer to the corresponding point on the inverted cone 19 than the width of the collapsed can body to be fed. The reverse taper of the section 26 is such that it will permit a can body which has slid into a position of rest on the track 21 to move out of its inclined position and into a horizontal position as shown for the can body 27 in Fig 2.

A track 28 extends longitudinally of the machine parallel to the track 21 and inwardly of the bearing 22.

In this way the can body 27 is brought to rest in a horizontal position supported by the tracks 21 and 28. This movement of the can body into horizontal position is facilitated by the reentrant slope of the portion 26 of the member 24.

By rotating the cone 24 the can bodies are sufficiently agitated to slide freely from the inclined positions to the final horizontal position for body 27. However, to facilitate this separation of the bodies and their agitation, I provide a series of flutes 29 on the conical member 25.

The lower end of shaft 23 carries a bevel gear 30. Adjacent the beveled gear 30 the base 9 has a depending bracket 31 which carries a journal bearing 32 for a drive shaft 33. A second beveled gear 34 meshing with gear 30 is slidably mounted on the drive shaft 33 to which it is connected by means of sliding over keys 35, 35. This sliding arrangement for the beveled gears permits the separation of the bases 8 and 9 and their associated parts to provide for can bodies of different dimensions.

It will be seen from Fig. 2 that the left-hand end of body 27 supports the next can body 36 at one edge while the opposite or right-hand edge still rests upon the cone 25. Body 36 cannot be released from this position until body 27 is moved out allowing the left end of body 36 to fall into the space occupied by the body 27 whereupon the body 36 changes from an inclined position to a horizontal one.

Above body 36, bodies 37 are supported loosely in the same arrangement between the cones 19 and 25.

The bases 8 and 9 on one side have laterally extending brackets 38, 39 which form journals for a horizontal shaft 40. This shaft carries a sprocket 41.

A similar horizontal transverse shaft 42 is likewise journaled at the opposite end of the bases 8 and 9. The shaft 42 carries a sprocket 43.

The inner side of the rail 28 is provided with a track 44 in line with the sprockets 41 and 43.

An endless chain conveyer 45 is trained over sprockets 41 and 43.

At spaced intervals the links of the chain 45 are enlarged to provide dogs 46, 46. These dogs extend vertically from the chain 45 and traverse the space occupied by the lowermost can body 27 (see Fig. 2). Each dog 46 as it traverses the bottom of the hopper 11 will push the bottom body 27 forward over the tracks 21 and 28. This movement is followed by the fall of the next body 36 of the stack into the lower horizontal position from which it will, in turn, be advanced by the next succeeding dog 46.

It is some times necessary, due to stoppage of the re-forming machine, or its delivery means, to arrest the feed of the can bodies 27 from the hopper 11. I have, therefore, provided an automatic stop effective to block the fall of all cans in the stack except the one at that moment resting on the rails 21 and 28. This stop consists of a rock shaft 49 journaled horizontally in the side walls of the hopper sections 12 and 13. In the space between these sections the shaft is provided with fingers 50, 50 which normally rest in a vertical position, or are back of the slope of the cone 25 as seen in Fig. 2.

At one end the shaft 49 carries a rock arm 51 which is connected by any suitable linkage to that portion of the re-forming machine or its delivery means which is relied upon to control the feed from the hopper 11. When the rock arm 51 is raised, fingers 50, 50 project above the cone periphery 25 and support the right-hand ends of the can bodies 36. In this position the right-hand ends of the can bodies are held above the dogs 46 even though their left-hand ends may be in the lowermost position. As soon as feeding is to be resumed, fingers 50, 50 are dropped out of their holding position and the can bodies rest again upon the cone 25. At this moment the lowermost can body passes the cone 25 and takes the horizontal position of the body 27 and feeding is resumed.

The conveyer 45 advances the can bodies successively toward the floating horn 52 of the re-forming machine. Due to the fact that the horn 52 may vary its position vertically, it is important to assure proper presentation of the open end of the can body. This is accomplished by providing a universally movable shoe 53. The shoe has a side groove which forms a continuation of track 21. The forward end of the shoe 53 has a pivot pin 54 horizontally journaled in a block 55. Vertical pivot 56 permits the shoe to oscillate in a horizontal plane. This motion, however, is controlled by the spring 57 anchored to an arm 58 of the bracket 59 in which the block 55 is pivotally held by the pivot 56. This centering guide for the can bodies on to the floating horn is disclosed in detail and claimed in the patent granted Oswald Thanem December 7, 1948, No. 2,455,827.

Opposite the shoe 53 the rail 28 is continued as a supporting track 60.

From the above description it will readily be seen that a stack of collapsed can bodies 36 can be placed in hopper 11 and will fall freely until their positions are individually shifted by the cones 19 and 25. The lowermost body takes a horizontal position as shown by body 27 and is carried forward by the dog 46 into the re-forming machine.

Until the can body 27 is moved by the bottom of the stack, it forms a support for the can bodies held in inclined position between the two cones. The lowermost body 36 of the stack slips down into horizontal position replacing the can body 27. The other can bodies fall by gravity past the cone to the extent permitted by this movement.

The conveyer dog 46 advances the collapsed can between the track 60 and the universally adjustable shoe 53 and insures proper presentation to the floating horn 52 of the can re-forming machine.

In the event of stoppage, the fingers 50 will support the upper ends of the can bodies in the stack off from the face of the agitating cone 25 and thus prevent their fall into horizontal position.

Withdrawal of the stop immediately causes the bottom body to fall into the horizontal position on the rails 21 and 28 and feeding is resumed.

It will be apparent that the purposes of this invention may be carried out regardless of minor changes in proportions and arrangement of parts within the scope of the following claims.

What I claim is:

1. A machine for feeding collapsed can bodies comprising a chute for holding a vertical stack of horizontally arranged can bodies, an outwardly sloping abutment underlying one side wall of the chute, an inwardly sloping cone underlying the opposite side wall of the chute and spaced from the abutment less than the width of the can body, means for rotating the cone, a horizontal rail spaced beneath the abutment, a second rail beneath the cone and means for conveying can bodies along said rails.

2. A machine for feeding collapsed can bodies comprising a chute for holding a vertical stack of horizontally arranged can bodies, an outwardly sloping abutment underlying one side wall of the chute, an inwardly sloping cone underlying the opposite side wall of the chute and spaced from the abutment less than the width of the can body, said cone having a reversely tapered bottom section, means for rotating the cone, a horizontal rail spaced beneath the abutment, a second rail beneath the cone and means for conveying can bodies along said rails.

3. A machine for feeding collapsed can bodies comprising a chute for holding a vertical stack of horizontally arranged can bodies, an outwardly sloping abutment underlying one side wall of the chute, an inwardly sloping cone underlying the opposite side wall of the chute and cooperating with the abutment to support bodies in positions inclined to the horizontal, means for rotating the cone, a horizontal rail spaced beneath the abutment the thickness of a collapsed can body, a second rail beneath the cone and receiving a can body in horizontal position as it passes the abutment, said horizontal body obstructing the passage of the bodies in the stack beyond the abutment, and means for conveying can bodies along said rails.

4. A machine for feeding collapsed can bodies comprising a chute for holding a vertical stack of horizontally arranged can bodies, an outwardly sloping abutment underlying one side wall of the chute, an inwardly sloping cone underlying the opposite side wall of the chute and cooperating with the abutment to support bodies in positions inclined to the horizontal, means for rotating the cone, a horizontal rail spaced beneath the abutment, a second rail beneath the cone to receive a can body in horizontal position, means for conveying can bodies along said rails and means movable inwardly of the cone to prevent a can body from dropping past the cone onto the adjacent rail.

WILLIAM FURMINGER.

REFERENCES CITED

The following references are of record in the file of this patent:

UNITED STATES PATENTS

| Number | Name | Date |
|---|---|---|
| 962,316 | Cobb | June 21, 1910 |
| 1,092,613 | Warme | Apr. 7, 1914 |
| 2,297,847 | Wilckens et al. | Oct. 6, 1942 |

FOREIGN PATENTS

| Number | Country | Date |
|---|---|---|
| 503,739 | Great Britain | Apr. 13, 1939 |